United States Patent [19]

Haendle et al.

[11] 4,215,365
[45] Jul. 29, 1980

[54] X-RAY DIAGNOSTICS INSTALLATION COMPRISING AN ELECTRONIC TRANSMISSION CHANNEL FOR THE X-RAY IMAGE

[75] Inventors: Joerg Haendle; Hartmut Sklebitz, both of Erlangen, Fed. Rep. of Germany

[73] Assignee: Siemens Aktiengesellschaft, Berlin & Munich, Fed. Rep. of Germany

[21] Appl. No.: 13,683

[22] Filed: Feb. 21, 1979

Related U.S. Application Data

[63] Continuation of Ser. No. 793,138, May 2, 1977.

[30] Foreign Application Priority Data

Nov. 10, 1976 [DE] Fed. Rep. of Germany ....... 2651307

[51] Int. Cl.$^2$ ............................................. H04N 5/32
[52] U.S. Cl. ............................ 358/111; 250/416 TV;
250/320
[58] Field of Search ............................. 350/111, 211;
250/492 R, 493, 320, 416 TV, 213

[56] References Cited

U.S. PATENT DOCUMENTS

| 3,515,870 | 6/1970 | Marquis | 250/320 |
| 4,019,083 | 4/1977 | Limper | 313/372 |

Primary Examiner—Robert L. Griffin
Assistant Examiner—Edward L. Coles
Attorney, Agent, or Firm—Hill, Van Santen, Steadman, Chiara & Simpson

[57] ABSTRACT

In the illustrated embodiment an electronic transmission channel for converting an X-ray image into a television signal has an illumination device arranged in the optical path leading to the television pickup tube for providing a weak diffuse illumination of the target of the television pickup tube. It is found that such illumination enables the use of a television pickup tube having an cadmium-selenide layer, for example, without the buildup of negative potentials during scanning of the target in the absence of an X-ray image. The illumination device may be formed by one or more luminescent diodes.

3 Claims, 1 Drawing Figure

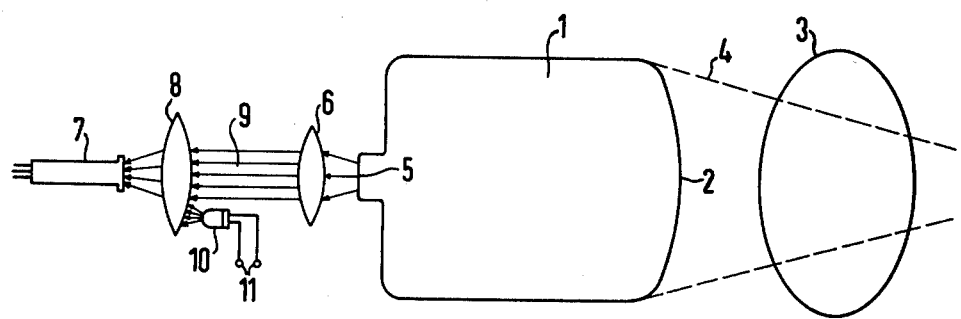

X-RAY DIAGNOSTICS INSTALLATION COMPRISING AN ELECTRONIC TRANSMISSION CHANNEL FOR THE X-RAY IMAGE

This is a continuation of application Ser. No. 793,138, filed May 2, 1977.

BACKGROUND OF THE INVENTION

The invention relates to an X-ray diagnostics installation comprising an electronic transmission channel with a television pickup tube, said electronic transmission channel transmitting the x-radiation issuing from the patient.

It is prior art to electronically intensify the x-ray image by means of an x-ray image intensifier, to pick up the output image of the x-ray image intensifier with the aid of a television pickup tube, and to reproduce this image, for example, via a television display unit. In this case, it is possible to also photograph the image on the television display unit by means of a camera. If a normal vidicon is used as the television pickup tube for an x-ray diagnostics installation of the type initially cited, the comparatively great inertia (response lag) has an adverse effect. A vidicon-type camera tube having a lead oxide photoconductive layer provides a higher speed of response to changing light patterns, but is virtually ruled out on account of too great a transverse conductivity of the target. When using a television pickup tube having a cadmium-selenide (CdSe) layer; for example, an image pickup tube sold under the trademark "Chalnicon", the transverse conductivity of the layer is indeed sufficiently low; however, this tube does not attain the low inertia of a lead oxide type of vidicon, and like the tubes having a lead oxide layer, it has the undesirable property that the free surface of the layer becomes charged to negative potentials during scanning of the target in the absence of an input light signal. The consequence of this is a signal compression in the dark image regions.

SUMMARY OF THE INVENTION

The object which is the basis of the invention consists in producing an x-ray diagnostics installation of the type initially cited wherein the negative charge of the light sensitive layer of the target of the television pickup tube is eliminated and wherein its inertia-properties are improved.

In accordance with the invention, this object is achieved by means of an illumination device arranged in the optical path of rays in front of the television pickup tube, said illumination device serving the purpose of providing a weak, diffused illumination of the target of the television pickup tube. Through this diffuse illumination, the occurrence of negative potentials during scanning of the non-illuminated target can be prevented entirely. In addition, the inertia (response lag) of the television pickup tube is substantially reduced.

Other objects, features and advantages of the invention will be apparent from the following detailed description taken in connection with the accompanying sheet of drawings.

BRIEF DESCRIPTION OF THE DRAWING

The single FIGURE of drawing shows a diagrammatic illustration of an illustrative embodiment of the present invention.

DETAILED DESCRIPTION

The drawing illustrates an x-ray image intensifier 1 manifesting an inlet screen 2 on which the x-radiation 4, issuing from a patient 3, and produced by a non-illustrated x-ray tube, impinges. In x-ray image itensifier 1, the x-ray image is electronically intensified. The intensified x-ray image is reproduced on an outlet fluorescent screen 5 with which an image intensifier lens system 6 is associated. In order to pick up the image on fluorescent screen 5, a television pickup tube with a cadmium-selenium (CdSe) layer, 7, is provided which is associated with a lens system 8.

In the telecentric path of visible light rays 9 between lens systems 6 and 8 there is arranged a luminescent diode 10 which is connected to a suitable voltage source via terminals 11. The luminescent diode 10 constitutes a source of steady (unmodulated) visible light and radiates into lens system 8 of television pickup tube 7 and brings about a weak, diffuse illumination of the target of television pickup tube 7. This weak, diffuse illumination has the effects which were described initially; i.e., prevention of a charging of the free surface of the layer to negative potentials during scanning of the non-illuminated target, and a reduction in the inertia (response lag). Thus, the response time of the target to changing light levels is improved by the use of illumination device 10.

Within a framework of the invention, it is also possible to provide a number of luminescent diodes, if necessary, instead of one single luminescent diode. In addition, the luminescent diode, or luminescent diodes, can also be replaced by other suitable unmodulated (constant or steady) light sources.

The invention permits an improvement in the x-ray image of an x-ray diagnostics installation comprising an image intensifier-television chain during the production of stored x-ray images; for example, x-ray photographs on an x-ray film, as well as during x-ray transillumination (or radioscopy).

It will be apparent that many modifications and variations may be effected without departing from the scope of the novel concepts and teachings of the present invention.

We claim as our invention:

1. An x-ray diagnostics installation comprising an electronic transmission channel, transmitting the x-radiation issuing from the patient, with a television pickup tube, characterized in that for the purpose of avoiding signal compression in the dark image regions an illumination device is arranged in the optical path of rays in front of said television pickup tube, for the weak, diffuse, illumination of the target of said television pickup tube, and means comprising said illumination device for preventing negative charging of the light sensitive layer of the target during scanning of the target in the absence of an input light signal.

2. An installation according to claim 1 wherein the transmission channel comprises an x-ray image intensifier with a lens system at its outlet fluorescent screen, characterized in that the illumination device is arranged between this lens system of the image intensifier and the lens system of the television pickup tube, and that it radiates into the lens system of the television pickup tube.

3. Installation according to claim 1, characterized in that the illumination device is formed by one or more luminescent diodes.

* * * * *